Feb. 26, 1963 R. P. BECHLE 3,078,824
HOT MELT ADHESIVE EXTRUDER
Filed April 4, 1960 7 Sheets-Sheet 1

INVENTOR.
RUDOLPH P. BECHLE
BY Kane, Dalsimer & Kane

ATTORNEYS

Feb. 26, 1963   R. P. BECHLE   3,078,824
HOT MELT ADHESIVE EXTRUDER
Filed April 4, 1960   7 Sheets-Sheet 2

INVENTOR.
RUDOLPH P. BECHLE
BY Kane, Dalsimer & Kane

ATTORNEYS

INVENTOR.
RUDOLPH P. BECHLE
BY Kane, Dalsimer Kane
ATTORNEYS

Feb. 26, 1963   R. P. BECHLE   3,078,824
HOT MELT ADHESIVE EXTRUDER
Filed April 4, 1960   7 Sheets-Sheet 4

INVENTOR
RUDOLPH P. BECHLE
BY Kane, Dalsimer & Kane
ATTORNEYS

Feb. 26, 1963 R. P. BECHLE 3,078,824
HOT MELT ADHESIVE EXTRUDER
Filed April 4, 1960 7 Sheets-Sheet 6

INVENTOR.
RUDOLPH P. BECHLE
BY Kane, Dalsimer & Kane
ATTORNEYS

Feb. 26, 1963  R. P. BECHLE  3,078,824
HOT MELT ADHESIVE EXTRUDER
Filed April 4, 1960  7 Sheets-Sheet 7
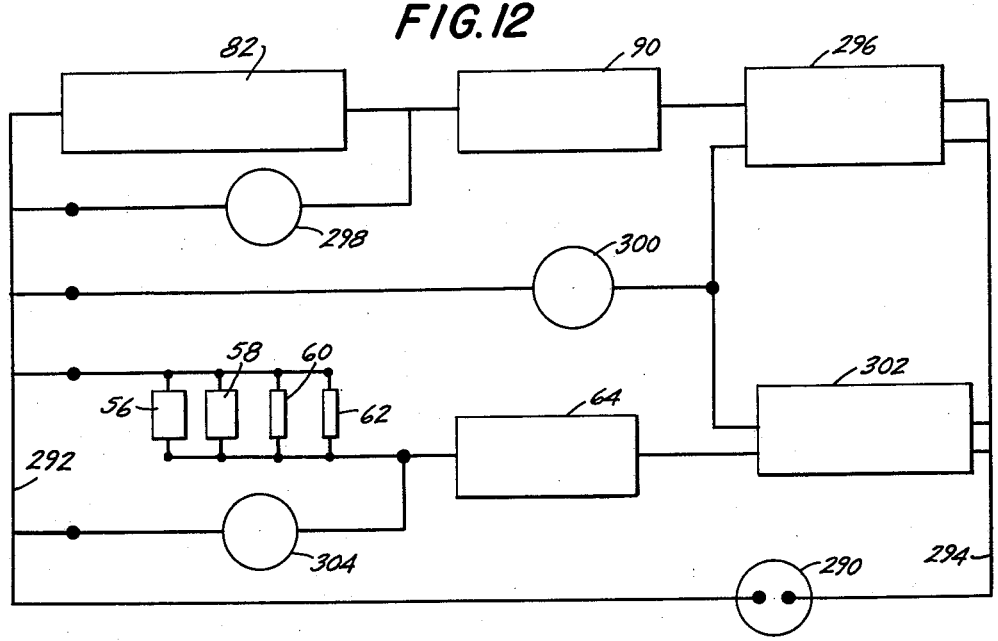
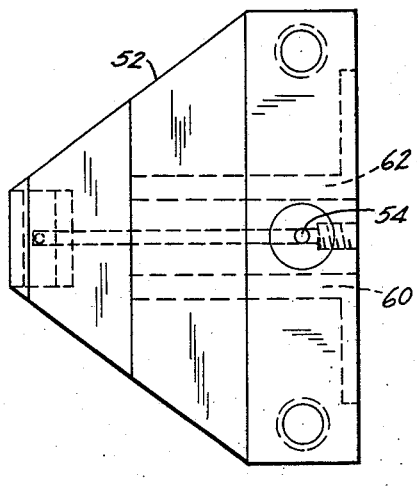
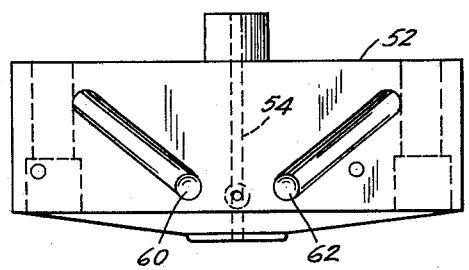
INVENTOR.
RUDOLPH P. BECHLE
BY Kane, Dalsimer & Kane
ATTORNEYS United States Patent Office 3,078,824
Patented Feb. 26, 1963

3,078,824
HOT MELT ADHESIVE EXTRUDER
Rudolph P. Bechle, Wyckoff, N.J., assignor to Potdevin Machine Co., Teterboro, N.J., a corporation of New York
Filed Apr. 4, 1960, Ser. No. 19,837
9 Claims. (Cl. 118—410)

This invention relates to a hot melt adhesive extruder, and more particularly, to a hot melt adhesive extruder which meets the rigid requirements of high speed application and continuous line control in a closed system desirable for paper bag manufacture.

The demand from industry for adhesives and applying devices to give continuous high speed bonds on new, tougher stocks has increased many fold. This is particularly the case in paper bag manufacturing where optimum production and strong finished bags are essential. For many years the use of hot melt adhesive has become increasingly important to the packaging industry. These synthetic materials are desirable because of their superior strength and relatively quick set. Up to now, it has been difficult to develop a simple, inexpensive and fast machine capable of applying such adhesives. Foremost among the many advantages of hot melt adhesives are the remarkable fast production speeds that are attainable with them. This is due largely to the fact that setting time depends only on heat loss, there being no liquid solvents in such adhesives.

Therefore, these adhesives are extremely useful in bonding polyethylene, the new wet strength krafts and other impervious surfaces. Bag seaming is a field that demands fast set and high strength of the contemplated hot melt adhesives.

Accordingly, the present invention provides an improved extruder for such adhesives because of its rugged nature and design for continuous service, in addition to its ability to meter usable molten material with consistent tolerances that are well within production criteria. A family of hot melt adhesives in granular form are commercially available. In this connection, the instant extruder contemplates the use of low cost granular or pelletized hot melts, including polyethylene. Since the extruder is basically a closed system, it overcomes the difficulties caused by air in bulk melting. Furthermore, oxygen is prevented from attacking the high molecular weight polymers involved because air never reaches the hot melt area.

Further objects of this invention include an extruder that is easy to mount and use; is rugged and of compact construction; designed for use on bag seaming operations where the material to be bonded is fed in continuous web form; is capable of taking its drive from a parent machine with which it is usually associated thereby rendering the adhesive output a function of the feed of the material to be bonded, this resulting in a continuously controlled line; designed to be mounted so that a nozzle applies the hot melt as near as possible to the nip point, the high setting speed of the hot melt adhesives producing an immediate bond; and eliminates the need for adhesive pot clean-up, in that, with heaters incorporated into the extruder turned off, any adhesive left in the applicator hardens until it is remelted when the heaters are turned on again.

The important object of the present invention is to provide an improved extruder for hot melt adhesives whereby the disadvantages encountered by undesirable dripping of the adhesive, after shut off or stopping of the application operation, is minimized and is substantially, in most instances, eliminated.

In accordance with a preferred embodiment of this invention, an extruder will include an adhesive applying member having thermostatically controlled heaters for supplying a predetermined amount of heat to the applying member to assure proper melt characteristics of the adhesive during extruder operation. This applying member may be in the form of a nozzle which includes an orifice through which molten adhesive flows. A heating barrel assembly includes an elongated chamber mounted at one end of the applying member and is heated by a thermostatically controlled heater unit for placing the adhesive in proper molten condition prior to its discharge through the nozzle orifice. Cooling fins and a water jacket are at the other end of the chamber for offsetting any undesirable effects that may result from the adhesive being prematurely placed in a molten condition, and consequently affect the operation of that part of the extruder which cooperates to drive the adhesive through the chamber and out through the nozzle orifice. Granular or pelletized forms of hot melt adhesives are loaded into a large capacity hopper and are carried forward through the chamber by a screw. This screw possesses an increasing root diameter along its length towards the discharge nozzle and cooperates to force any entrapped air, by compression, back out through the hopper. A clutch controlled drive means rotates the screw and is actuated by a fluid pressure mechanism when it is desired to start and stop the feeding operation. A valve is employed through interengaging surfaces of the screw and applying member adjacent the discharge orifice for closing the orifice upon cessation of the adhesive feed to minimize and eliminate adhesive dripping from the nozzle. This valve is similarly actuated by means of a fluid pressure mechanism and has its operation synchronized with the starting and stopping of the rotation of the screw. A shiftable bracket for mounting the extruder functions to raise and lower the extruder to place the applicator nozzle away and near the surface on which the hot melt adhesive is to be applied. This bracket is shiftable through a fluid actuated means which is also synchronized with the operation of the screw as well as the valve.

Other objects and advantages will become apparent from the following detailed description which is to be taken in conjunction with the accompanying drawings illustrating preferred embodiments of the present invention and in which:

FIG. 12 is a schematic circuit diagram employed for the extruder heaters and related electrical components;

FIG. 13 is an enlarged top plan view of the applicator nozzle; and

FIG. 14 is a rear elevational view of the nozzle.

Figure 1:
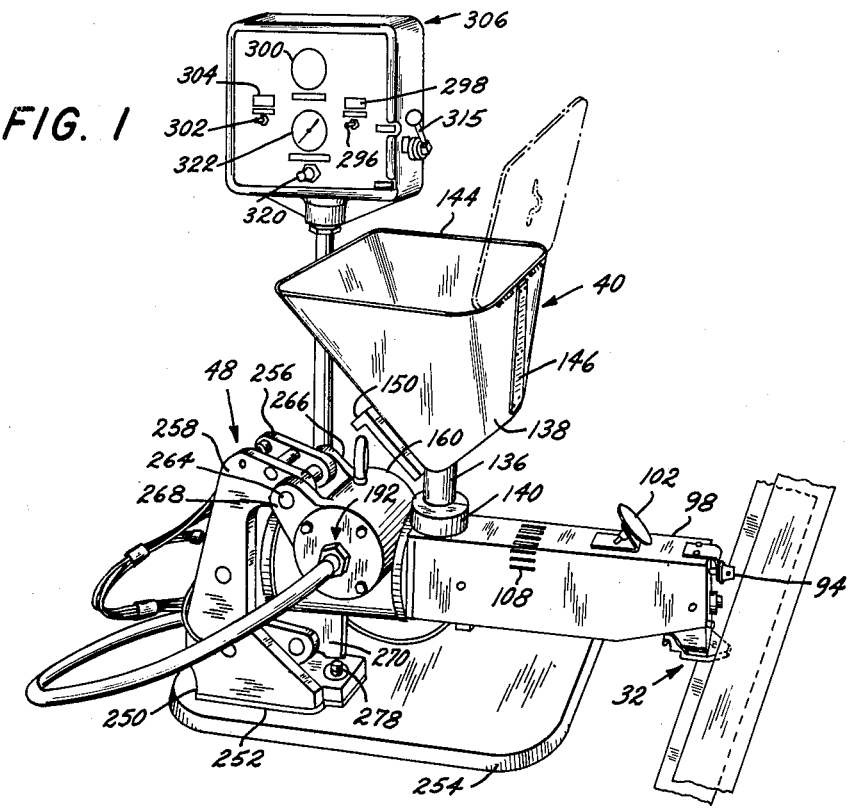
FIG. 1 is a perspective view of an extruder, incorporating the teachings of the present invention in an operative position, during which it is adapted to apply adhesive to the material that is to be bonded and fed through the extruder in web form, with the hinged hopper cover having a handle shown in phantom.
Figure 2:
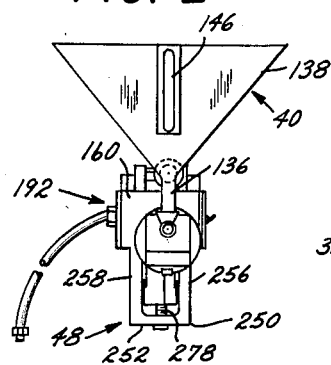
FIG. 2 is a schematic front elevational view of the extruder.
Figure 3:
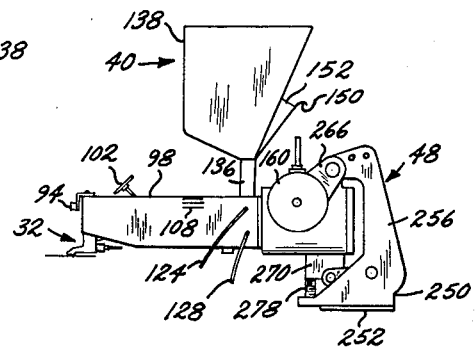
FIG. 3 is a schematic side elevational view of the extruder.

Referring now to the drawings wherein a hot melt adhesive extruder 30 is illustrated, it will be observed that a seam applicator 32 is mounted at one end of a heating barrel assembly 34. This heating barrel assembly 34 is coupled with a coaxial cooling barrel assembly 36, both of which are adapted to rotatably receive a screw 38. A hopper assembly 40 is in communication with the interior of the cooling barrel assembly 36 as well as the heating barrel assembly 34. A fluid actuated mechanism 42 is coupled to the rear end of the screw 38 and is adapted to shift the screw 38 to open and close a valve 44 present at the other or forward end. The screw 38 is connected to a clutch controlled drive mechanism 46 which, upon actuation, is adapted to induce rotation of the screw. The extruder 30, and consequently applicator 32, is adapted to be raised and lowered through the operation of a shiftable bracket 48.

The applicator 32 functions to apply molten adhesive, as for example, along a seam line in bag seaming at relatively high speeds and as near as possible to the nip point. As will be appreciated, the high setting speed of the contemplated hot melt adhesives will, accordingly, produce an immediate bond of the bag material which will be fed, ordinarily, through the extruder 30 in continuous web form. Under the circumstances, applicator 32 of the disclosed embodiment will include a head 50 and depending nozzle 52. Head 50 and nozzle 52 are secured to one another and cooperate to provide an orifice 54 through which molten adhesive is adapted to flow for application to the material to be bonded. The head 50 encases a pair of heating elements 56 and 58 in suitably formed bores for such purposes. On the other hand, the nozzle 52 similarly mounts a pair of heating elements 60 and 62. These heaters in the applicator 32 serve to assure the proper elevated temperatures of the hot melt adhesives as they are extruded, and further facilitate the remelting of the adhesive when it has hardened subsequent to the operation of the extruder 30 and turning off the applicator heaters. The head heaters 56 and 58 and nozzle heaters 60 and 62 are all regulated by means of a thermo-switch control 64 which is suitably mounted on the heal of the nozzle 52.

Reference is now made to the heating barrel assembly 34 which serves to heat the hot melted adhesives driven therethrough by screw 38 to the desired temperature prior to their flow into the orifice 54 and discharge from the applicator 32. In this connection, the heating barrel assembly 34 includes a barrel or chamber 80, the front end of which is connected to the head 50 such that the interior of the chamber is in communication with the orifice 54. A barrel heating unit 82 embraces the chamber 80 and extends over a part of its exterior, substantially as shown. In addition, a thermo-well block 84 is on the outer face of the chamber 80 and exposed to the heating effect of the heating unit 82. An insulating material 86, as for example asbestos, is then wrapped around both the heating unit 82 and block 84. An asbestos washer 88 serves to close the heating unit 82 and block 84 at their rear ends and thereby cooperate with the asbestos packing 86. The heating unit 82 is regulated by a thermo-switch control 90 disposed in a suitably formed hole in the block 84. A bracket 92 on the head 50 cooperates to retain the thermo-switch control 90 properly within the block 84. The setting of the thermo-switch control 90 is accomplished by means of a dial 94 supported by and suitably spaced from bracket 96. This bracket 96 is mounted on guard 98 constituting part of the housing for the heating barrel assembly 34, which housing additionally includes a base plate 100. A thermometer 102 is mounted by a bracket 104 which is secured to the upper face of the guard 98 and extends through the heating barrel assembly to the chamber 80 for purposes of cooperating with the thermo-switch control 90 in assuring the proper temperature characteristics within the forward part of the chamber 80. A system of cooling fins 106 forming part of a cooling means to be described in detail shortly, surrounds the barrel 80 proximate the heating unit 82 and the block 84, with the asbestos washer 88 interposed therebetween.

It will be recalled, that the granular or pelletized hot melt adhesive contained within the hopper assembly 40 is fed through the chamber 80 and exposed to the heat dissipated by the heating unit 82 by the action of the screw 38. Under the circumstances, it is desirable to minimize and even prevent the transition of the hot melt adhesive employed into its molten form from occurring at too early a stage in the feeding process, and more particularly, at a location substantially before the zones of the barrel 80 embraced by the heating unit 82. It should be clear, that, the presence of molten adhesive at the rear end of the barrel 80, especially within the space defined by the cooling barrel assembly 36 adjacent the discharge end of the hopper assembly 40 as well as, the coupling of the shaft 38 to the fluid actuated mechanism 42, will tend to hamper proper functioning of the extruder 30, during normal extruding operations and at time, when it is desired to restart the extruder 30, after shutting it down completely to thereby permit the hot melt adhesive, which is usually thermoplastic, to harden. Consequently, a cooling means is preferably utilized along those adhesive feeding passages before the heating unit 82 is actually traversed or encountered. To this end, the cooling fins 98 will dissipate heat out through a network of slots 108 in guard 106. In addition to the cooling fins 106, the cooling means includes the cooling barrel assembly 36, which cooperates to circulate a coolant for purposes of lowering the temperature of the ambient surrounding the rear end of the screw 38. In this connection, the cooling barrel assembly includes a barrel 110 coaxial with and forming a continuation of barrel 80. A pair of flanges 112 and 114 are mounted on the barrel 110 in spaced relationship, with the front flange 112 having anchored thereto a ring 116, which secures in place, the rear end of the barrel 80. A cylinder 118 is interposed between, the flanges 112 and 114, and cooperates therewith, as well as with the barrel 110, to provide a conduit 120 for the passage of the coolant, which under ordinary circumstances can be water. An intake pipe 122 is tapped into conduit 120 and is internally threaded at its outer end for coupling with a correspondingly threaded nipple of an inlet hose connection 124 coming from a water supply. A return pipe 126 is tapped into the base of conduit 120 and is likewise internally threaded for receiving, the nipple of a hose connection 128 for purposes of either recirculating the water or disposing of it as desired. Accordingly, if the hot melt adhesive within hopper assembly 40 be in either granular or pelletized form or the like, it will be expected that this adhesive will remain in this form until it is a relatively shorter distance from the heating unit 82.

The screw 38 is of progressively increased radius along its length from its rear end to the front end, to assure uniform flow characteristics of the molten adhesive through the orifice 54 of the applicator 32. Under such circumstances, the quantity of adhesive driven forward by the rear part of the screw 38, will occupy substantially the entire space between the outer faces of the forward part of the screw 38 and forward part of chamber 80. The air, that would ultimately become undesirably entrapped in this lower part of chamber 80, is forced to the rear and out through the hopper assembly 40. Further details of the screw 38 will be described shortly in connection with the discussion of the fluid actuated mechanism 42 and valve 44.

As stated in the above, the present invention contemplates the use of low cost granular or pelletized hot-melt adhesives, such as polyethylene, which are readily handled and result in an overall relatively simple and neat operation. Under the circumstances, the granular form of hot-melt adhesive employed may simply be poured into the hopper assembly 40. Referring now to the hopper assembly 40, it will be observed that a hopper mounting guide 134 is in communication with the interior of the barrel 110 of the cooling barrel assembly 36 and extends through suitably formed openings in this barrel, as well as guard 98 and cylinder 118. This guide telescopically receives the lower cylindrical end 136 of hopper 138. A clamp ring 140 serves to retain the lower end 136 of the hopper 138 in proper relationship with respect to the mounting guide 134. In this connection, an asbestos spacer 142 may be interposed between the upper face of the guard 98 and bottom of the ring 140 to insulate any heat that may tend to be conducted to the ring. As will be appreciated, the hopper 138 may pivotally mount a cover 144 having the usual handle and a transparent gauge 146 for determining the amount of hot-melt adhesive in the hopper. In this connection the discharge of the granular adhesive into the interior of the barrel or chamber 110 can be regulated by the incorporation into the hopper assembly 40 of a relatively simple feed shut-off 150 which is slidable along suitable tracks on a mounting bracket 152 projecting from the hopper 138. As will be observed, the shut-off 150 is slidable into and out of the interior of the lower end 136 of the hopper 138 to close and open, respectively, the available discharge opening.

The fluid actuated mechanism 42 mentioned in the foregoing operates to shift the screw 38 such that the valve 44 opens and closes respectively when it is desired to apply and stop the application of molten adhesive to the material to be bonded. This mechanism 42, accordingly, is coupled to the rear end 156 of the screw 38 projecting beyond the corresponding end of the cooling barrel 110. A sealing ring 158 is preferably interposed between the screw 38 and this end of the barrel 110. The fluid actuated mechanism 42 is enclosed within the housing 160 of the drive means 46, which housing is suitably secured to flange 114 through the employment of a suitable number of bolts substantially as shown. The fluid actuated mechanism 42 includes a spindle 162 keyed to the rear end 156 of the screw 38. This spindle 162 is rotatably received by an adapter 164 through interposed spindle bearings 166 and thrust bearings 168. The adapter 164 is formed with radial flange 170 which is advantageously disposed in a correspondingly formed recess 172 in the drive housing 160. In this connection, the depth of this recess 172 is somewhat larger than the thickness of the flange 170 so that relative displacement is permissible for purposes that will become evident shortly. One or more guide pins 174 may be employed for assuring proper orientation of the adapter 164 with respect to the surfaces of the drive housing 160. Under such circumstances, the pins 174 may project from the housing 160 into suitably formed openings in the adapter flange 170 while at the same time permitting relative longitudinal displacement of these members. A flexible diaphragm 176 extends across the recess 172 of the drive housing 160 in bearing relationship with the outer face of the flange 170 of the adapter 164 and in most instances is preferably secured thereto. The diaphragm 176 is employed in conjunction with the cover 178 anchored to the drive housing 160 by means of a number of suitably placed bolts as illustrated. This cover 178 is fabricated with a substantially circular recess 180 of relatively small depth and is substantially coaxial with respect to the recess 172 but possesses a diameter of slightly lesser dimension. The recess 180 in the inner face of the cover 178 communicates with a port 182 in the cover which is adapted to be connected to a fluid pressure supply.

Thus, when the port 182 is tapped to a suitable air pressure supply, the pressurized medium will act against the diaphragm 176 and consequently displace longitudinally the flange 170 relative to recess 172. The adapter 164 will then force the spindle 162 forwardly and at the same time cause shifting of the screw 38 in this direction. As a result of such pressure actuation and movement of parts, the valve 44 will close to seal off the orifice 54 of the applicator assembly 32. Obviously when this pressure is relieved, the diaphragm 176 will function to retract the displaced parts and consequently open the valve 44.

It should be understood that the displacement of parts in the fluid actuated mechanism 42 are of relatively small magnitude because the opening and closing of the valve 44 need only traverse similarly short distances to enable the molten adhesive to be fed properly from the interior of chamber 80 into the orifice 54. The valve 44, under the circumstances preferably includes a valve plug 186 which may be an integral extension of the screw 38. This plug is adapted to be received by valve seat 188 which may be coaxially formed with respect to the orifice 54 in the applicator head 50.

Turning now to the drive means 46 which is employed to impart the desired rotation to the screw 38, it will be observed that this means may be coupled to a main drive 192 which may be in the form of a flexible shaft. This flexible shaft may be coupled to a parent machine which may be of the type employed in bag manufacturing that supplies the material to be bonded in continuous web form. Accordingly, the drive means 46 will take its drive from the parent machine in rotating the screw 38. Consequently, the adhesive output can be made to be a function of the web speed. As the web speed goes up or down the screw speed and adhesive output increases or decreases thereby giving a continuously controlled adhesive line. The drive means 46 rotates screw 38 as a result of the meshing of a worm wheel 194 secured to the spindle 162 and worm 196 keyed to a worm shaft 198. This shaft 198 has keyed at one end thereof a clutch plate 200. This clutch plate 200 is adapted to engage and disengage clutch plate 202 in a manner to be described shortly. A needle bearing 204 is interposed between the clutch plate 202 and shaft 198. A retaining ring 206 is placed on this shaft 198 adjacent the needle bearing 204. A double row ball bearing 208 is interposed between the clutch plate 202 and the adjacent walls of the housing 160, with the retaining ring 210 performing its usual function. The housing 160 at this location may be constructed in the form of a bearing retainer 212 which is adapted to rotatably receive one end of the clutch plate 202 so that it may be coupled to a flexible drive shaft employed in the main drive 192.

The distal end of the worm shaft 198 is coupled to a fluid pressure actuated mechanism similar to that previously discussed so that the worm shaft 198 can be shifted longitudinally to cause clutch plate 200 to engage or disengage the clutch plate 202, as the case may be, for purposes of rotating or stopping the movement of the screw 38. This fluid actuated mechanism can also be of the flexible diaphragm variety, but it should be understood that a cylinder and displaceable piston type of unit can be employed. For purposes of the present detailed description of the invention, a diaphragm type of unit has been illustrated and will be described. In addition, for the purpose of clearly illustrating and accentuating an embodiment of this invention, clearly depicted schematically in FIGS. 10 and 11, the fluid actuated mechanism in these views is illustrated in the form of a piston cylinder type of unit.

Thus, this end of the worm shaft 198 is rotatably mounted by means of a bearing 216 to an adapter 218. The bearing 216 is suitably retained in place by means of a pin 220 and ring 222, substantially as shown. The adapter may include a central plug 224 and packing 226 as well as a radial flange 228. This flange 228 is adapted to shift in accommodating recess 230 formed in the housing 160 with the proper orientation of these parts maintained by the use of one or more guide pins 232. The displacement of the flange 228 in the recess 230 should be sufficient to permit the clutch plates 200 and 202 to engage as well as disengage. In addition, this relative movement should be sufficient to move the worm 196 laterally to rotate the worm wheel 194 and screw 38, radially counter to the screw's normal rotation. This is done to offset any slight pistoning effect on the molten adhesive from driving the screw 38 forward for valve shut-off. As will be appreciated by those skilled in the art, the worm 196 and worm wheel 194 should be of the self-locking type to prevent the worm 196 from rotating during its retraction. Naturally other means can be employed to lock the worm 196 to prevent it from rotating.

A flexible diaphragm 236 cooperates to shift the adapter 218 and consequently the worm shaft 198 with the worm 196 keyed thereto. This diaphragm 236 extends across the recess 230 in the drive housing 160 and is suitably secured in place for proper functioning by means of a covering plate 238 which may be secured to the housing 160 by means of a suitable number of bolts. A threaded adapter 240 may project trrough the cover 238 for purposes of communicating with the outer face of the diaphragm 236 so that a suitably connected fluid pressure supply can be exposed to this face. It should be understood that an outlet or bleeding port 242 may communicate with the inner face of the diaphragm 236, substantially as shown. A suitable tubing and fittings may obviously be employed to connect this port to a fluid pressure supply and exhaust line. In an effort to supplement the retraction of the worm 196 and naturally shaft 198 and adapter 218, one or more compression springs 244 may be employed as shown.

Thus, when the diaphragm 236 is flexed inwardly against the outer face of the adapter 218, shaft 198 and consequently the worm 196 will be shifted axially so that the clutch plates 200 and 202 engage to permit the main drive 192 to rotate the screw 38 through interposed worm 196 and worm wheel 194. By the same token, when it is desired to stop the rotation of the screw 38, the clutch plates 200 and 202 need only be disengaged by the retraction of the diaphragm 236.

Figure 4:
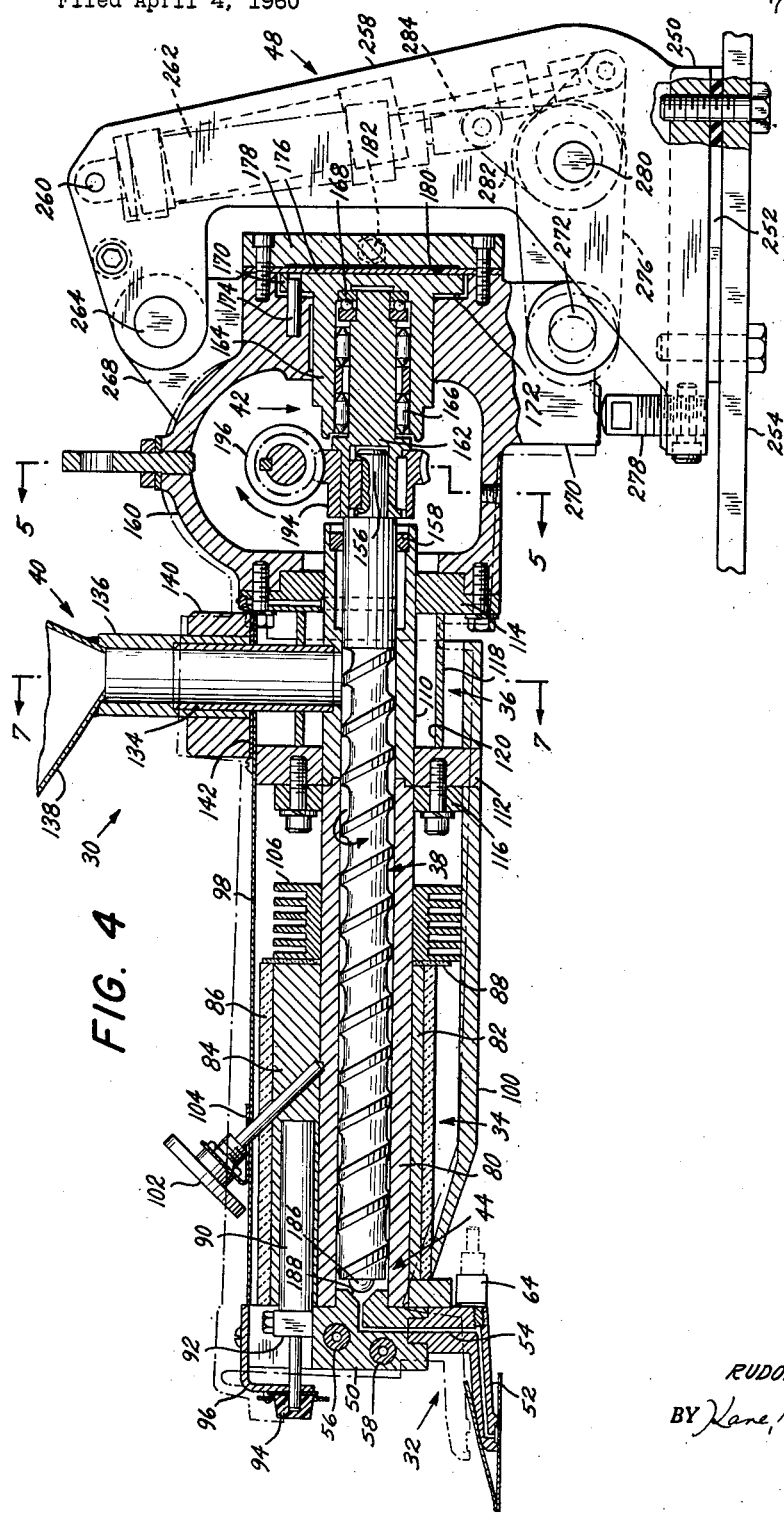
FIG. 4 is a longitudinal sectional view of the extruder with certain parts broken away and removed, in its operative position, during which, it is adapted to apply adhesive to the selected surfaces, the inoperative position of the extruder, during which it is elevated being shown by dot-dash phantom lines.
Figure 5:
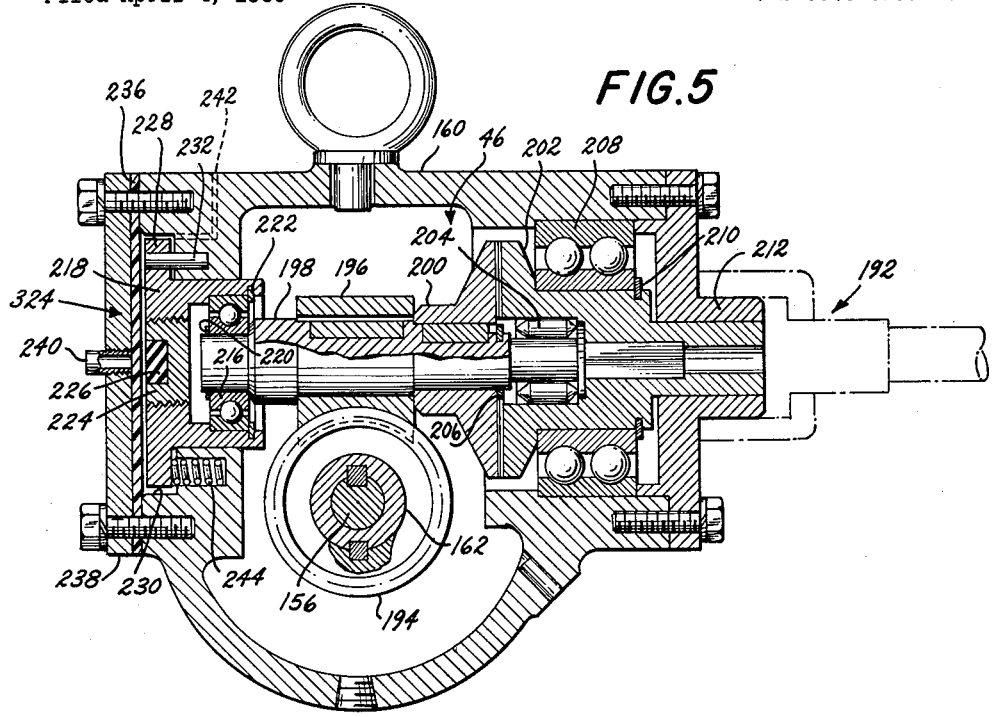
FIG. 5 is a sectional view taken along lines 5—5 of FIG. 4 illustrating the fluid actuated clutch controlled drive mechanism of the extruder.
Figure 9:
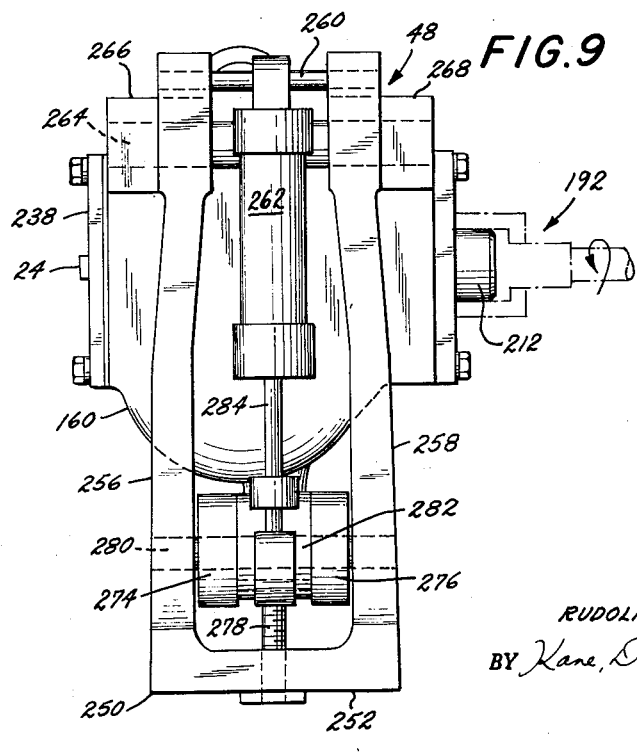
FIG. 9 is a rear elevational view of the shiftable bracket mount employed for purposes of raising and lowering the extruder, with the mount being shown in a position, at which, the applicator nozzle is lowered to an adhesive applying position.
Figure 6:
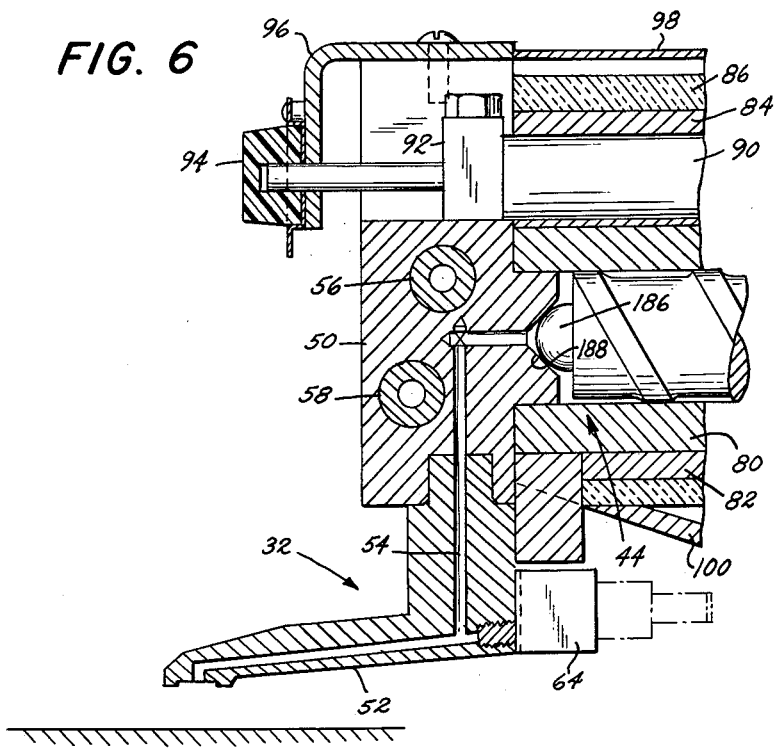
FIG. 6 is an enlarged fragmentary sectional view illustrating the extruder in its inoperative position, at which, the applicator nozzle is raised and the valve closed.
Figure 8:
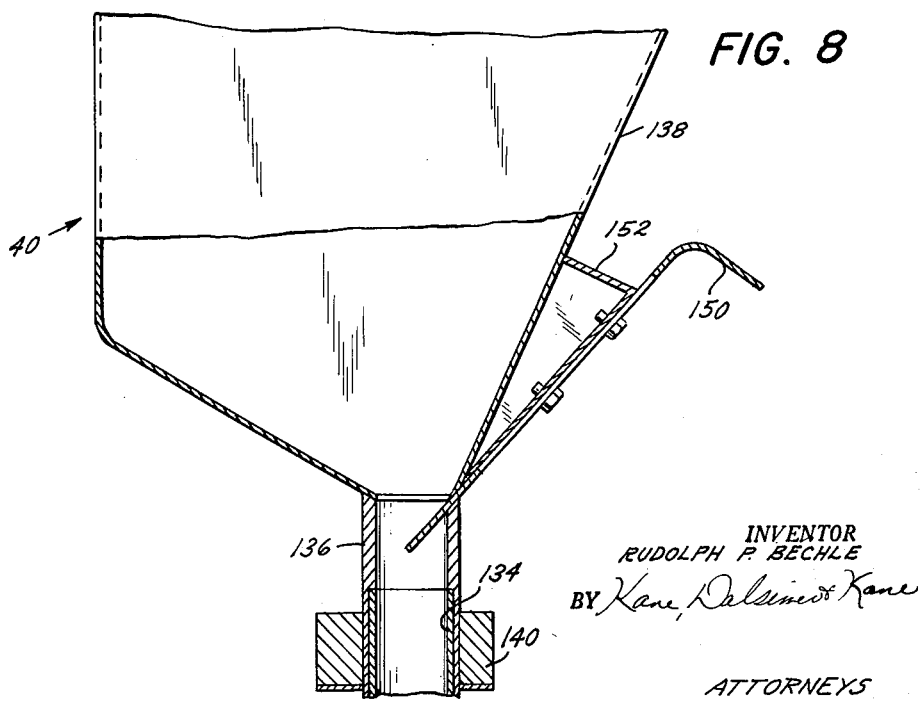
FIG. 8 is a fragmentary longitudinal sectional view of the hopper assembly showing the details of the hopper shut-off.
Figure 7:
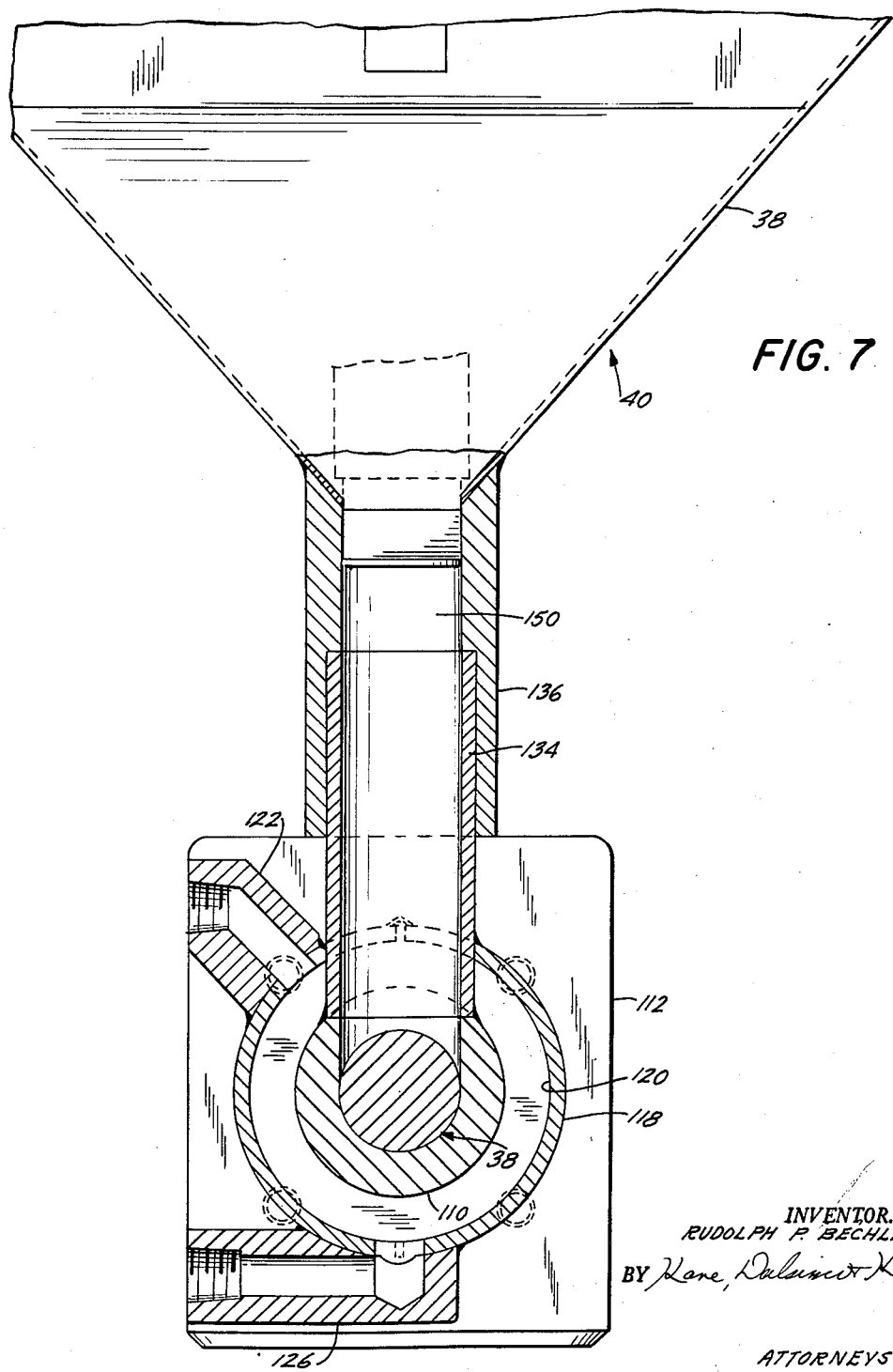
FIG. 7 is an enlarged sectional view taken along the lines 7—7 of FIG. 4 illustrating the coupling of the hopper assembly and cooling barrel assembly, as well as, details of the water jacket of the latter assembly.

As previously stated, the shiftable bracket mount 48 is adapted to raise and lower the extruder 30 for purposes of removing or applying, respectively, the applicator nozzle 52 relative to the material to be bonded. The raising and lowering of both extruder 30 and applicator nozzle 52 are illustrated, respectively, by phantom and solid lines in FIG. 4. To this end, the bracket mount 48 includes a bracket 250 having a base plate 252, which is adapted to be bolted to a support platform or table 254, and vertical bracket arms 256 and 258. These arms, at their upper ends, mount a transversely extending rod 260 which rotatably mounts the upper end of a cylinder 262. The arms 256 and 258, in addition, include laterally extending sectors which mount a pivot pin 264 which serves to rotatably mount a pair of arms 266 and 268 which are integral projections of the drive housing 160. In this connection, the housing 160 includes a downwardly depending base 270 which mounts a pivot pin 272 which pivotally mounts one end of link 274 as well as link 276. The base 270 is adapted to raise upon an adjustment stud 278, substantially as shown, for purposes of adjusting the position of the applicator nozzle 52 with respect to the material to be bonded. The other ends of links 274 and 276 are pivotally mounted on an eccentric pivot pin 280 which also mounts an eccentric lever 282 which is pivotally connected also to the rod 284 of the piston displaceable pin cylinder 262. The solid and dash lines of FIG. 7 represents the location of the foregoing parts when the applicator head 52 is in a position to apply molten adhesive to the material to be bonded. On the other hand the dot-dash lines represent the relative location of these parts when the extruder 30 and consequently the applicator head 52 are elevated. This elevation is accomplished by means of the actuation of the piston 284 relative to its mounting cylinder 262. The manner in which this is done in relationship to the operation of the various other parts of the extruder 30 will be explored in detail shortly.

In FIG. 12, a wiring diagram is illustrated for the heaters and their respective controls. Thus, a source of electricity 290 serves to energize the two heating sections for the extruder 30 with a separate thermostat control for each section. The barrel heating unit 82 and its thermoswitch control 90 are connected across leads 292 and 294 and is adapted to be energized by a double-pole off-on switch 296. A pilot light 298 is connected across the barrel heater unit 82 to indicate when this unit is on and off. A main pilot light 300 is connected across leads 292 and 294 and is adapted to be turned on with the actuation of the switch 296. Furthermore, this main pilot light 300 is adapted to be energized by means of a second double-pole on-off switch 302 which serves to actuate the heaters of the applicator 32. Thus, the head heaters 56 and 58 and nozzle heaters 60 and 62 with their single thermoswitch control 64 are connected between leads 292 and 294, substantially as shown. Pilot light 304 is adapted to light upon the energization of these applicator heaters. Both of the switches 296 and 302 are adapted to be mounted by means of the control panel 306 together with their accompanying pilot lights 298 and 304. In addition, this control panel 306 may mount the main light 300.

Figure 10:
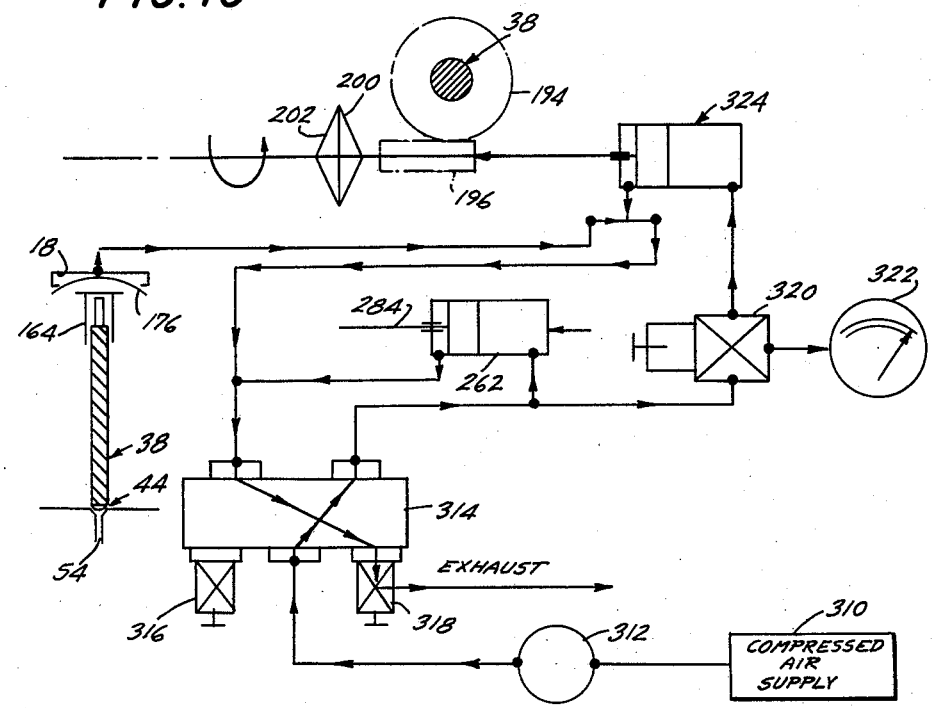
FIG. 10 is a schematic view of pneumatic circuitry incorporated in the extruder, at such a time as the extruder is in an operative position.
Figure 11:
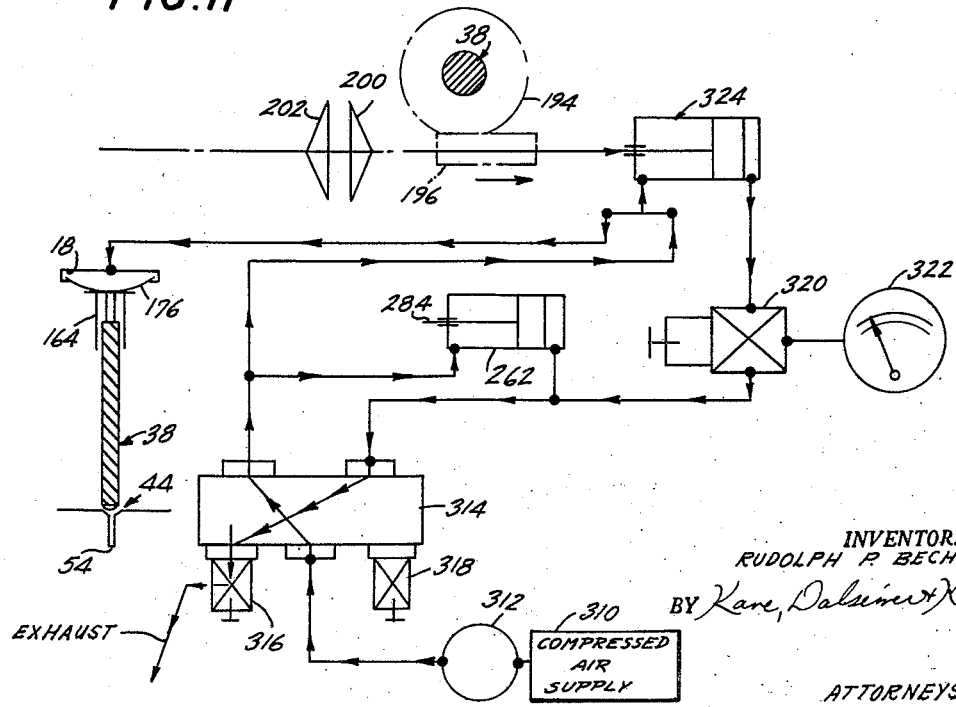
FIG. 11 is a similar schematic view of the pneumatic circuitry illustrating the relationship of the components when the extruder is inoperative.

Referring now to FIGS. 10 and 11 which illustrate schematically a pneumatic circuit usable with the present invention for purposes of placing the extruder 30 in both an operating and non-operating position. Accordingly, in FIG. 10, extruder 30 is shown in an operating position during which hot melt adhesive in molten form is applied to the material to be bonded as, for example, material in web form utilized commercially in bag manufacturing. In this position the extruder 30 is conveniently tapped into a suitable compressed air supply 310 which compressed air is passed through air filter 312 into a manually controlled four-way valve 314 which may be of the type supplied commercially by Versa of Brooklyn, New York. This valve 314 may be manually controlled by a handle 315 on the control panel 306. This four-way valve as employed in the present invention utilizes adjustable bleed controls 316 and 318. The compressed air passes through the four-way valve 314 into the double acting air cylinder 262 which is employed to shift the piston rod 284 in moving the extruder 30 and applicator nozzle 52 upwardly and downwardly with respect to the material to be bonded. When the extruder 30 is in an operative position, the piston rod 284 is projected with respect to its mounting cylinder 262 so that the applicator nozzle 52 is in its downward adhesive applying position. Compressed air from valve 314 additionally branches off through pressure regulator 320 which is coupled to air pressure gauge 322, both of which appear on the control panel 306. These components accomplish their usual function. The pressure regulator 320 is then connected to a double acting air cylinder 324 which may be employed in the present invention in shifting the worm 196 to reverse the rotation of the screw 38 and cause the clutch plates 200 and 202 to engage. On the other hand, this schematic designation of a double acting air cylinder may be taken to be the diaphragm actuated unit including the diaphragm 236 and adapter 218 or their equivalent. As stated in the foregoing, this schematic designation is employed to accentuate the lateral shifting of the worm 196 relative to the worm wheel 194. The double acting air cylinder 324 is shown in its extended position at which the clutch plates 200 and 202 are engaged such that the main drive 192 rotates the worm 196 and worm wheel 194 to turn the screw 38. Under the circumstances, the granular or pelletized hot metal adhesive contained in the hopper 138 passes down through the hopper base 136 and guide 134 into the interior of the barrel 110 from whence it is driven by the rotating screw 38 through the chamber 80 out through the orifice 54, it being remembered that the valve 44 is now in its open position. In this connection the diaphragm 176 is in a retracted position thereby unseating valve 44 and with the recess 180 being subjected to an exhaust line having the forward part of the cylinder 324 and 262 tapped therein. This exhaust line passes into and is exhausted out through the bleed control 318.

When it is desired to place the extruder 30 in an inactive position, the manually controlled lever 315 is shifted to a second position at which the four-way valve 314 as well as the accompanying circuitry functions in a manner illustrated in FIG. 11. Thus, the compressed air supply passes through the four-way valve 314 such that the pistons within both cylinders 262 and 324 are retracted and the diaphragm 176 flexed such that it causes the valve 44 to close. The double acting air cylinder 262 and accompanying piston will place the extruder 30 and applicator nozzle 52 in its upward position at which it is away from the material to be bonded. The retraction of the piston in the cylinder 324 causes the clutch plates 200 and 202 to become disengaged to thereby prevent further rotation of the screw 38 by means of the main drive 192. At such time the worm 196 will move laterally to rotate the worm wheel 194 and screw 38 counter to the screw's normal rotation so that the slight pistoning effect of driving the screw forward during valve closing is offset. The air pressure acting behind the diaphragm 176 will shift the screw 38 forwardly to close the valve 44 thereby preventing any of the molten adhesive within the chamber 80 from flowing out through the orifice 54 so that dripping from the nozzle 52 of the molten adhesive is minimized and in most cases eliminated to a substantial degree. It will be observed that during this active position of the extruder 30 the air exhaust from both cylinders 262 and 324 is passed into valve 314 and exhausted through the bleed control 316. The present invention takes into consideration the prevention of scoring of the valve seat 188 by the consequences of operations of first having the screw 38 back off slightly and then shift forwardly for the valve shut-off.

Thus, in one position of the valve 314 the extruder 30 and applicator nozzle 52 is lowered and placed at a location immediately adjacent the material to be bonded and simultaneously therewith the valve 44 is opened and the clutch plates 200 and 202 engaged to rotate the screw 38 for the main drive 192. Conversely, in a second position of valve 314 the extruder 30, as well as nozzle 52 are elevated away from the work to be bonded, the valve 44 closed with an accompanying screw rotation which offsets the slight pistoning effect during valve closing, and the clutch plates disengaged simultaneously therewith to prevent further flow of adhesive material through the orifice 54.

Thus, the aforenoted objects and advantages are most effectively attained. Although several preferred embodiments of the invention have been disclosed therein, it should be understood that the present invention is in no sense limited thereby and should be determined by the scope of the appended claims.

What I claim is:

1. In a hot melt adhesive extruder having a hot melt adhesive applying member, having an orifice through which molten adhesive is adapted to flow, a heating chamber for placing the adhesive in molten condition, a screw in said chamber for forcing the molten adhesive within said chamber through said orifice, drive means for rotating the screw, and means for feeding hot melt adhesive into said chamber, the improvement of means for cooperating to inhibit the flow of molten adhesive from said chamber into said orifice upon cessation of operation of said screw, the inhibiting means comprising in combination a valve including a valve plug on said screw and valve seat at said orifice for receiving said plug, the valve plug being an integral extension of said screw and the valve seat being disposed within said chamber in concentric relationship with respect to the orifice, screw-shifting means cooperating to shift the screw to open and close the valve, the screw-shifting means being coupled to one end of the screw and being so constructed and arranged that it normally shifts said screw to cause said plug to rest on said seat to close said valve and upon actuation thereof to shift said screw to withdraw said plug from said seat to open said valve, the said drive means including a main drive, a drive connection coupling said drive and said screw such that normally prevents the drive from rotating the screw and upon actuation thereof, said drive is adapted to rotate said screw, and synchronization means interconnecting said screw-shifting means and said drive connection for opening said valve substantially simultaneously with the actuation of said drive connection and closing of said valve substantially simultaneously with the return of said drive connection to its normal condition.

2. The invention in accordance with claim 1, wherein means are provided for reversing the rotation of said screw to substantially eliminate flow of molten adhesive through said orifice upon closing of said valve.

3. In a hot melt adhesive extruder having a hot melt adhesive applying member, having an orifice through which molten adhesive is adapted to flow, a heating chamber for placing the adhesive in molten condition, a screw in said chamber for forcing the molten adhesive within said chamber through said orifice, drive means for rotating the screw, and means for feeding hot melt adhesive into said chamber, the improvement of means for cooperating to inhibit the flow of molten adhesive from said chamber into said orifice upon cessation of operation of said screw, the inhibiting means comprising in combination, a valve including a valve plug on said screw and a valve seat at said orifice for receiving said plug, means cooperating to shift the screw to open and close the valve, the drive means including a main drive, a drive connection coupling said drive and said screw, and said connection including a fluid actuated friction clutch so constructed and arranged that the clutch is normally disengaged to prevent the drive from rotating the screw and upon actuation of said clutch, said drive is engaged to rotate said screw.

4. In a hot melt adhesive extruder having a hot melt adhesive applying member, having an orifice through which molten adhesive is adapted to flow, a heating chamber for placing the adhesive in molten condition, a screw in said chamber for forcing the molten adhesive within said chamber through said orifice, drive means for rotating the screw, and means for feeding hot melt adhesive into said chamber, the improvement of means for cooperating to inhibit the flow of molten adhesive from said chamber into said orifice upon cessation of operation of said screw, the inhibiting means comprising in combination, a valve including a valve plug on said screw and a valve seat at said orifice for receiving said plug, means cooperating to shift the screw to open and close the valve, the screw shifting means including a fluid-actuated mechanism coupled to one end of the screw and being so constructed and arranged that it normally shifts said screw to cause said plug to rest on said seat to close said valve and upon actuation thereof to shift said screw to withdraw said plug from said seat to open said valve, the drive means including a main drive, a drive connection coupling said drive and said screw, said connection including a fluid actuated friction clutch so constructed and arranged that the clutch is normally disengaged to prevent the drive from rotating the screw and upon actuation of said clutch, said drive is engaged to rotate said screw, and synchronization means interconnecting the fluid actuated mechanism and the fluid actuated clutch for opening said valve substantially simultaneously with the actuation of said clutch and closing of said valve substantially simultaneously with the disengagement of said clutch.

5. The invention in accordance with claim 4, wherein, means are provided for shifting said extruder to raise and lower said applying member to place said member away and near, respectively, a surface on which the hot melt adhesive is to be applied, and such means for shifting said extrudeer being in synchronization with the fluid actuated mechanism and fluid actuated clutch such that the applying member is adapted to be lowered substantially simultaneously with the opening of said valve and rotation of said screw and is further adapted to be raised substantially simultaneously with the closing of said valve and disengagement of said clutch.

6. A hot melt adhesive extruder comprising in combination: an adhesive applying member having a first thermostatically controlled heater means for supplying a predetermined amount of heat to said applying member, and said applying member having an orifice through which molten adhesive is adapted to flow; an elongated chamber mounting, at one end thereof, said applying member, said chamber having an interior communicating with said orifice, a second thermostatically controlled heater means embracing said chamber along a portion of its length adjacent said applying member for placing hot melt adhesive in said chamber in a molten condition, cooling means at the other end of said chamber for minimizing the thermal affects of said second thermostatically controlled heater means on said hot melt adhesive in said chamber at said other end, said cooling means including liquid circulating conduits and cooling fins projecting from said chamber at a location intermediate said conduits and second thermostatically controlled heater means; hopper means for supplying hot melt adhesive into said other end of said chamber; a rotatable screw within said chamber for forcing the hot melt adhesive through said chamber and the molten adhesive through said orifice, said screw having an increasing root diameter along its length towards said applying member; clutch controlled drive means for rotating said screw; means for cooperating to inhibit the flow of molten adhesive from said chamber into said orifice upon cessation of operation of said screw, the inhibiting means comprising in combination a valve including a valve plug on said screw and a valve seat at said orifice for receiving asid plug, and means cooperating to shift the screw to open and close the valve; and means for shifting said extruder to raise and lower said applying member to place said member away and near, respectively, a surface on which the hot melt adhesive is to be applied.

7. A hot melt adhesive extruder comprising in combination: an adhesive applying member having a first thermostatically controlled heater means for supplying a predetermined amount of heat to said applying member, and said applying member having an orifice through which molten adhesive is adapted to flow; an elongated chamber mounting, at one end thereof, said applying member, said chamber having an interior communicating with said orifice, a second thermostatically controlled heater means embracing said chamber along a portion of its length adjacent said applying member for placing hot melt adhesive in said chamber in a molten condition, cooling means at the other end of said chamber for minimizing the thermal affects of said second thermostatically controlled heater means on said hot melt adhesive in said chamber at said other end, said cooling means including liquid circulating conduits and cooling fins projecting from said chamber at a location intermediate said conduits and second thermostatically controlled heater means; hopper means for supplying hot melt adhesive into said other end of said chamber; a rotatable screw within said chamber for forcing the hot melt adhesive through said chamber and the molten adhesive through said orifice, said screw having an increasing root diameter along its length towards said applying member; means for cooperating to inhibit the flow of molten adhesive from asid chamber into said orifice upon cessation of operation of said screw, the inhibiting means comprising in combination a valve including a valve plug on said screw and a valve seat at said orifice for receiving said plug, and means cooperating to shift the screw to open and close the valve; and clutch controlled drive means for rotating said screw.

8. A hot melt adhesive extruder comprising in combination: an adhesive applying member having a first thermostatically controlled heater means for supplying a predetermined amount of heat to said applying member, and said applying member having an orifice through which molten adhesive is adapted to flow; an elongated chamber mounting, at one end thereof, said applying member, said chamber having an interior communicating with said orifice, a second thermostatically controlled heater means embracing said chamber along a portion of its length adjacent said applying member for placing hot melt adhesive in said chamber in a molten condition, cooling means at the other end of said chamber for minimizing the thermal affects of said second thermostatically controlled heater means on said hot melt adhesive in said chamber at said other end, said cooling means including liquid circulating conduits and cooling fins projecting from said chamber at a location intermediate said conduits and second thermostatically controlled heater means; hopper means for supplying hot melt adhesive into said other end of said chamber; means for cooperating to inhibit the flow of molten adhesive from said chamber into said orifice upon cessation of operation of said screw, the inhibiting means comprising in combination a valve including a valve plug on said screw and a valve seat at said orifice for receiving said plug, and means cooperating to shift the screw to open and close the valve; a rotatable screw within said chamber for forcing the hot melt adhesive through said chamber and the molten adhesive through said orifice; and drive means for rotating said screw.

9. A hot melt adhesive extruder comprising in combination: an adhesive applying member having a first thermostatically controlled heater means for supplying a predetermined amount of heat to said applying member, and said applying member having an orifice through which molten adhesive is adapted to flow; an elongated chamber mounting, at one end thereof, said applying member, said chamber having an interior communicating with said orifice, a second thermostatically controlled heater means embracing said chamber along a portion of its length adjacent said applying member for placing hot melt adhesive in said chamber in a molten condition, cooling means at the other end of said chamber for minimizing the thermal affects of said second thermostatically controlled heater means on said hot melt adhesive in said chamber at said other end; hopper means for supplying hot melt adhesive into said other end of said chamber; a rotatable screw within said chamber for forcing the hot melt adhesive through said chamber and the molten adhesive through said orifice; means for cooperating to inhibit the flow of molten adhesive from said chamber into said orifice upon cessation of operation of said screw, the inhibiting means comprising in combination a valve including a valve plug on said screw and a valve seat at said orifice for receiving said plug, and means cooperating to shift the screw to open and close the valve; and drive means for rotating said screw.

References Cited in the file of this patent

UNITED STATES PATENTS

| | | |
|---|---|---|
| Re. 23,880 | Heston | Sept. 28, 1954 |
| 2,411,971 | MacMillin et al. | Dec. 3, 1946 |
| 2,722,716 | Henning | Nov. 5, 1955 |
| 2,734,226 | Willert | Feb. 14, 1956 |
| 2,944,286 | Kullgren et al. | July 12, 1960 |